(12) United States Patent
Dhua et al.

(10) Patent No.: US 8,413,903 B1
(45) Date of Patent: Apr. 9, 2013

(54) DECODING BARCODES

(75) Inventors: Arnab S Dhua, Mountain View, CA (US); Max Delgadillo, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 35 days.

(21) Appl. No.: 13/095,230

(22) Filed: Apr. 27, 2011

(51) Int. Cl.
*G02B 26/10* (2006.01)

(52) U.S. Cl.
USPC .............. 235/462.25; 235/462.09; 235/462.1

(58) Field of Classification Search .............. 235/462.25, 235/462.1, 462.01, 462.09
See application file for complete search history.

(56) References Cited

U.S. PATENT DOCUMENTS

| | | | |
|---|---|---|---|
| 6,201,901 B1 * | 3/2001 | Zhou et al. | 382/306 |
| 6,477,275 B1 * | 11/2002 | Melikian et al. | 382/217 |
| 6,814,289 B2 * | 11/2004 | Cummings et al. | 235/462.1 |
| 7,050,631 B2 * | 5/2006 | Bian et al. | 382/183 |
| 7,424,975 B2 * | 9/2008 | Cordery et al. | 235/462.09 |
| 2008/0296362 A1 * | 12/2008 | Lubow | 235/375 |
| 2011/0290880 A1 * | 12/2011 | Cai et al. | 235/437 |

\* cited by examiner

*Primary Examiner* — Ahshik Kim
(74) *Attorney, Agent, or Firm* — Novak Druce Connolly Bove + Quigg LLP

(57) ABSTRACT

Various algorithms are presented that enable an image of a barcode, captured by a camera of an electronic device, to be decoded on the device without need to upload the image information to a server for processing. The algorithms can account for variations in focus of the image, as may result in blur due to move movement or auto-focus features. The approaches can handle multiple barcode formats, and can handle barcodes on curved surfaces, barcodes with damaged areas, or barcodes that are otherwise uneven. Such algorithms are highly accurate while being fast and lightweight enough to execute on portable electronic devices, such as tablet computers and smart phones.

29 Claims, 7 Drawing Sheets

DECODING BARCODES

BACKGROUND

As portable electronic devices offer an ever-increasing amount of functionality, people are using these devices to assist with a greater variety of tasks. As an example, a person in a store might want to obtain information about an item, such as reviews for a book or a price from a retailer of that item. Some applications enable a user to capture an image of a barcode on an item, and upload that image to a central server where the image can be analyzed and decoded. Such an approach can require a significant amount of time and bandwidth to upload, and requires an acceptable cellular signal in many instances, which can be difficult to obtain in large brick and mortar stores or other such locations. While the functionality could be loaded onto the device, the varying amount of focus and resolution can make it difficult to decode these images using conventional algorithms, thus requiring a significant amount of processing capacity and power consumption, which might be unavailable or at least undesirable for a user of a small portable device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to obtaining information from a visual code. In particular, various embodiments provide for the decoding of any of a number of types of barcodes from a captured image that includes at least a readable portion of the barcode. The image can be captured using an image capture element of any appropriate device, such as a digital camera of a portable computing device. Because the cameras in such devices often utilize an auto-focusing feature that does not always focus on the intended item, can be affected by lighting conditions, etc., the image can be at least partially blurred or otherwise out of focus. Similarly, a device such as a tablet computer or smart phone often is held in a user's hand, and thus might be moving slightly while capturing the image. Any of a number of other reasons might lead to the image not being sufficiently in focus for conventional bar code reading algorithms to provide an accurate result in at least some cases.

In at least some embodiments, algorithms are provided that work even in the case of variations of the barcode in the image. For example, various algorithms are able to decode barcodes printed horizontally along a curved surface, such as may be the result of a label being placed on a bottle or can, which can result in some warping or distortion of the barcode in the captured image. Algorithms also can be configured to handle variations of specific barcode standards, as well as multiple barcode formats such as, but not limited to, UPC-A, EAN-13, UPC-E, and EAN-8 barcodes. At least some of these algorithms also can be executed quickly enough, and with a minimal amount of resources, such that in at least some embodiments the entire barcode reading and decoding process can be performed on the portable computing device. In other embodiments, a captured image or other such information can be sent to a remote server or other device for analysis, which then can return information relating to the barcode to the device.

Various other applications, processes and uses are presented below with respect to the various embodiments.

Figure 1A:
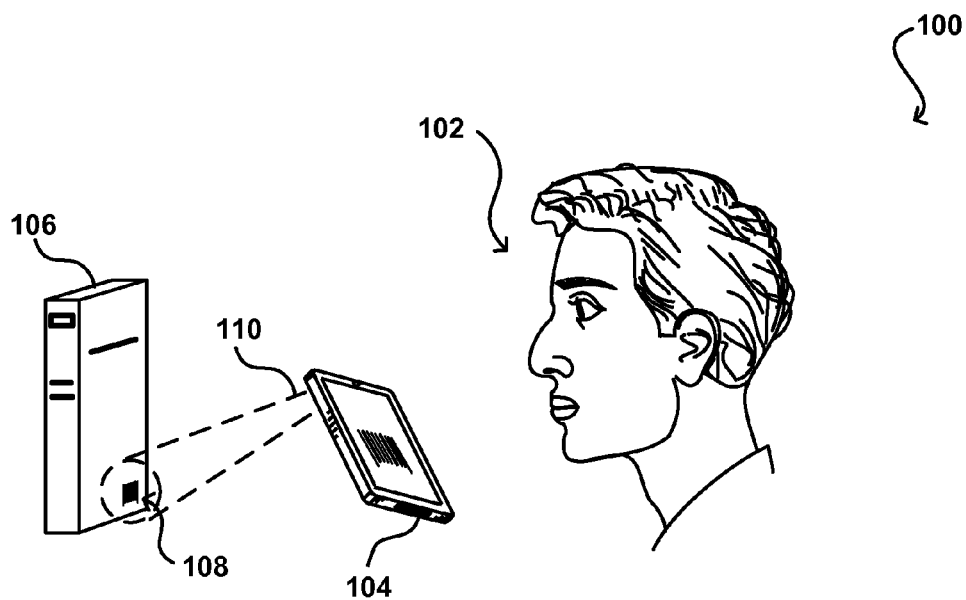
FIGS. 1(a) and 1(b) illustrate an example situation wherein a user captures an image of a barcode using a portable electronic device, which is then displayed on the electronic device.
Figure 1B:
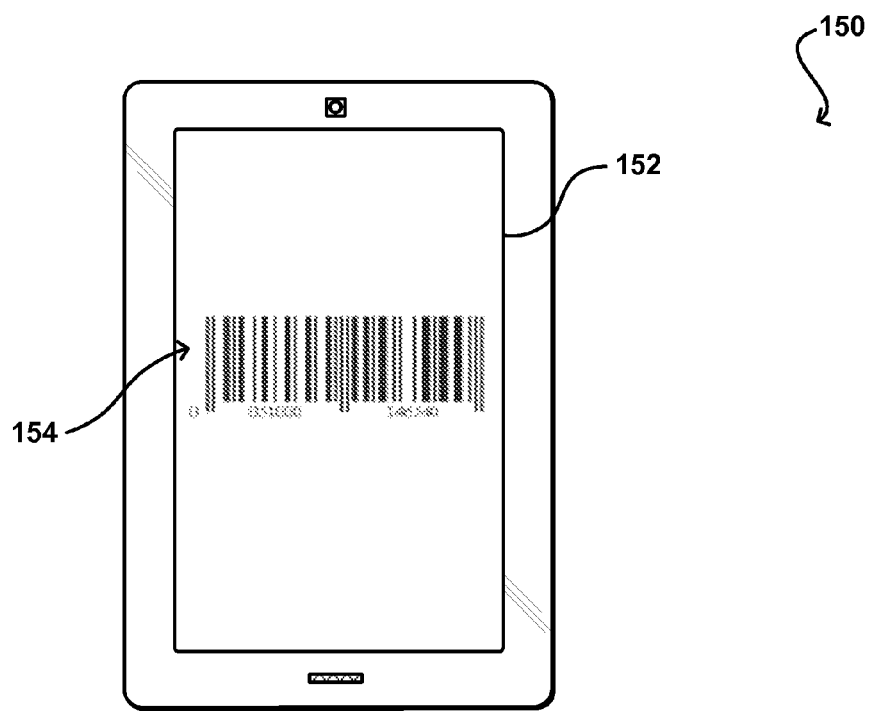

FIG. 1(a) illustrates an example environment 100 wherein a user 102 is operating an electronic device 104 that includes at least one image capture element. In this example, the user 102 locates an item or object of interest 106. If the user wants to obtain information about the item, such as a description or pricing information, the user 102 can manipulate the electronic device 104 until a viewable area 110 of a camera of the device includes a barcode 108 positioned on, attached to, or otherwise associated with, the item of interest 108. FIG. 1(b) illustrates an example of the barcode 154 when displayed as part of the captured image on a display element 152 of an electronic device 150.

Figure 2:
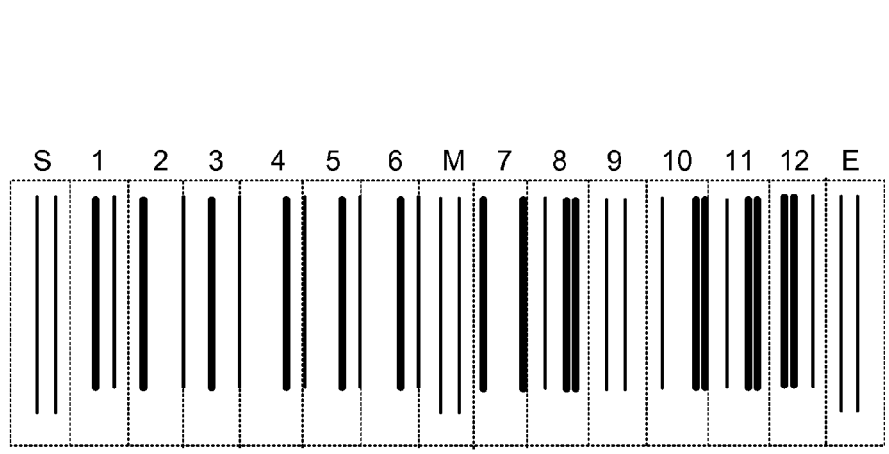
FIG. 2 illustrates an example of digits and fields in a conventional barcode format that can be analyzed in accordance with various embodiments.

FIG. 2 illustrates an enlarged view 200 of the example bar code displayed on the device in FIG. 1(b). As can be seen, the barcode in this example includes twelve digits (1-12), with each digit being represented by a 7-bit pattern. The bit pattern is comprised of a number of "vertical" lines that are either black or white, corresponding to a value of 1 or 0, respectively. The dotted lines represent the separation between patterns for adjacent digits. This example barcode also has a start pattern (S), a middle pattern (M), and an end pattern (E) as known in the art, for a total of ninety-five bits of information. In the figure, the start (left edge), middle, and end (right edge) patterns are each represented by a pair of lines that extend lower than the lines for each digit. As should be understood, other barcode formats can utilize different patterns or approaches as known in the art.

As mentioned, an image captured of a barcode such as that illustrated in FIG. 2 may often be at least slightly out of focus due to factors such as movement of the capturing device, movement of the item being captured, or an auto-focus feature on the capturing device. Improper focus can result in images that do not have clear transitions between black and white bars in the barcodes, but instead have differing regions or amounts of gray near the transitions. One approach is to use thresholding to convert the grayscale image into a binary black and white image (such as by setting any pixels in the image above a given threshold to black and all others to white), but such an approach is prone to error and can result in poor decoding performance. Due to the potential for a wide range of image qualities based at least in part upon the image capture conditions, it can be desirable to utilize an image analysis and/or decoding algorithm that is sufficiently robust to such variation in image quality.

Approaches in accordance with at least some embodiments take advantage of the fact that certain formats are known, and the formats can be used to assist in analyzing a captured barcode. For example, in FIG. 2 the left and right edges of the barcode can be determined, as well as the middle section (M) in at least some embodiments. Once these edges or sections are located, the portion of the barcode that corresponds to each digit can be determined, such as is illustrated by the dotted lines in FIG. 2. The portions for each digit then can be separately analyzed, such as by comparing each portion to a finite set of digit patterns expected at that position for the given barcode format. Such an approach effectively simplifies the decoding to a nearest neighbor search that can be addressed in at least some embodiments through pattern or template matching. In some embodiments, a single row or a few rows from the image might be sufficient to decode the barcode.

Figure 3:
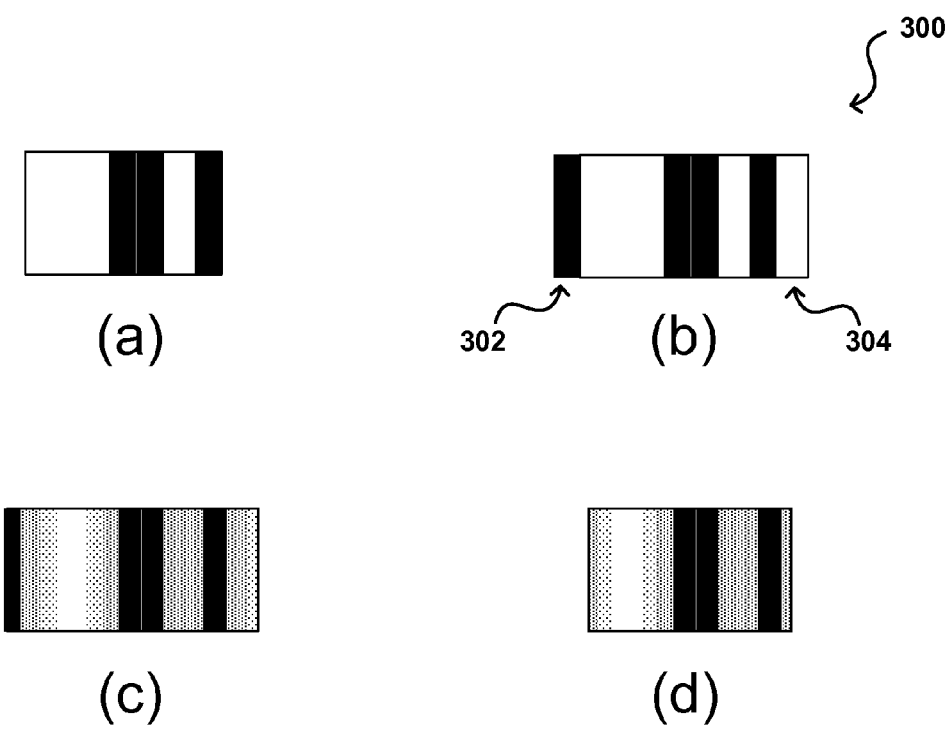
FIGS. 3(a), (b), (c), and (d) illustrate examples of a barcode digit being processed to form a template in accordance with various embodiments.

In order to perform pattern or template matching for the various digits, an offline portion of the process can first be performed wherein the patterns or templates are created. As mentioned, each printed digit in a barcode (for at least certain formats) is represented by a seven-bit pattern. For each digit, a two dimensional image template can be created for use in matching. As an example, FIG. 3(a) illustrates an example of a digit 300 that can be present in a barcode, represented by (from left to right) three white bars, two black bars, another white bar, and finally another black bar. While a pattern could be created based solely on this seven-bit representation, the matching results can be improved by taking into account the fact that barcode digits are designed in such a manner that when two digits are placed adjacent to each other, the last bit (value) of the first digit is complementary to the first bit (value) of the second digit. Thus, if a digit ends with a black bar, the following digit will begin with a white bar. Any blurring then likely will cause an adjustment in the level of gray based upon the adjacent bit of information.

Thus, as illustrated in FIG. 3(b), a start bar 302 and an end bar 304 can be added to the digit to represent the state of the adjacent bits, as it can assist with pattern matching to consider the adjustment in gray level due to these bits.

Since the captured barcode images will often be at least slightly blurred, one or more templates can be created by blurring the possible digit with the added bars, as illustrated in FIG. 3(c), with different amounts of blur. As can be seen, some effect of the added bars is reflected in the blurred template. Once the template is blurred, the added bars (e.g., augmented bits) can be removed from the pattern as illustrated in FIG. 3(d). This pattern then can be used for image matching with captured digits at each appropriate position in a barcode image. In at least some embodiments, there can be multiple patterns created for each digit with different levels of blurring, in order to improve the results of the image matching process.

Once the bar code templates are created, the templates can be stored to an accessible location, such as a central server or network storage. In at least some embodiments, the templates can also be stored locally on any electronic device operable to perform at least a portion of the decoding process. In some embodiments, a device can store certain common templates locally, and when necessary can send a request to a remote system or service for processing, etc.

A device having access to a decoding algorithm and the barcode templates then can capture and analyze an image of a barcode, in order to determine information encoded in the barcode. This information then can be used for any of a number of purposes as discussed elsewhere herein. In one example, a user might see a product or item of interest, such as a book, and might take a picture of a barcode on the cover of the book in order to obtain information about the book, such as related books, user reviews, or other such information. The user can utilize any appropriate image capture element on the device, such as a digital still or video camera.

In many cases, an image captured by a device will be a color image. For at least some image analysis and/or barcode decoding algorithms, results can be improved by first converting the image to a grayscale image. Further, analyzing grayscale images can be faster and less processor-intensive than for full-color images. A conventional method of converting a color image to grayscale is to perform a weighted combination of the red, blue, and green channels. Such an approach, however, often results in a loss of information that is otherwise available across those channels.

Accordingly, approaches in accordance with various embodiments utilize one or more algorithms that attempt to preserve as much contrast as is available across the three (or more) channels. In one embodiment, the color values are first scaled and/or normalized to have a value between 0 and 1, although other values could be used as well in other embodiments. For each pixel in a portion of an image that is to be analyzed, three different values can be computed from the red (R), blue (B), and green (G) channels:

$\min RGB = \min(R,G,B)$ – the minimum value from the three channels $\max RGB = \max(R,G,B)$ – the maximum value from the three channels $\text{avg}RGB = \text{mean}(R,G,B)$ – the average value from the three channels Using these values, a grayscale conversion algorithm can utilize these values as follows:

If $\min RGB > 0.5$ return $\max RGB$

Else If $\max RGB <= 0.5$ return $\min RGB$

Else return $\text{avg}RGB$

Thus, if all three values for a pixel are greater than 0.5 (after being normalized) then the maximum value of the three channels is used to set the grayscale value for that pixel. If all three values are instead less than or equal to 0.5 (after being normalized) then the minimum value of the three channels can be used. If some at least one channel value is above 0.5 and at least one is below 0.5, the average of the three channel values can be used. In this way, pixels that have relatively high color values for all three channels will be emphasized in most cases, and pixels with relatively low color values for all three channels will be de-emphasized in most cases. Such an approach helps to preserve information present across the three channels, although the resulting image can be slightly more grainy in appearance. The graininess does not negatively impact the analysis, while the increased contrast can result in more accurate decoding.

Figure 4:
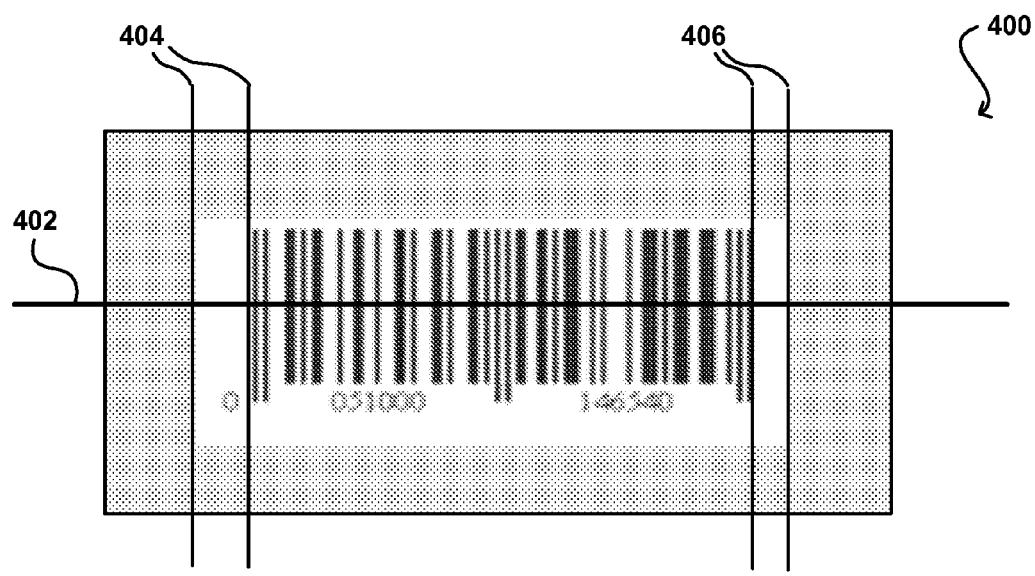
FIG. 4 illustrates an example of a scan line and white field extent determination for a barcode image in accordance with one embodiment.

After any desired grayscale conversion of the captured image has been performed (since some approaches may utilize color images), an approach in accordance with various embodiments can select at least one scan line across the barcode to be evaluated. In some embodiments the scanline is selected near the center of the image, while in other embodiments another selection approach can be used, such as to analyze a number of scanlines and select the most representative line, etc. FIG. 4 illustrates an example image 400 wherein a horizontal scanline 402 is selected that runs through a central portion of a barcode in the image. Various other orientations or locations can be used as well as should be apparent in light of the teachings and suggestions contained herein.

In this example, the scanline is traversed in at least one direction, such as from left to right, in order to attempt to locate an extent of white space, followed by a white to black transition (as the start bit of the barcode will in many formats be black on white). The amount of white space to be detected decreases while moving along the scanline. Multiple such sequences of pixels may be found while traversing from left to right, and a transition closest to the center of the image in some embodiments is chosen as the left end of the barcode, although other selection processes can be used as well in other embodiments. A similar process can be used while traversing in the opposite direction (i.e., from right to left) in order to locate the right end of the barcode. The locations of the white space (e.g., between lines 404 and lines 406) then can be stored in order to determine the location and/or width (e.g., left and right extent) of the captured barcode. In at least some embodiments, a check process can look at the relative widths and separation of the white spaces in order to determine whether the portion therebetween likely corresponds to a barcode.

Once the left and right extents of the barcode are located in the image, the region between those two extents in at least some embodiments can be scaled to an appropriate size, such as to an integral multiple of the number of bits of information expected to be present in the barcode. For a UPC-A or EAN-13 barcode, for example, the scaling would be to an integral multiple of 95 pixels. Once the image is scaled appropriately, the region between the left and right extents can be broken up into the constituent parts of the barcode as discussed with respect to FIG. 2, which include the start, middle, and end patterns, as well as each of the digits.

Figure 5:
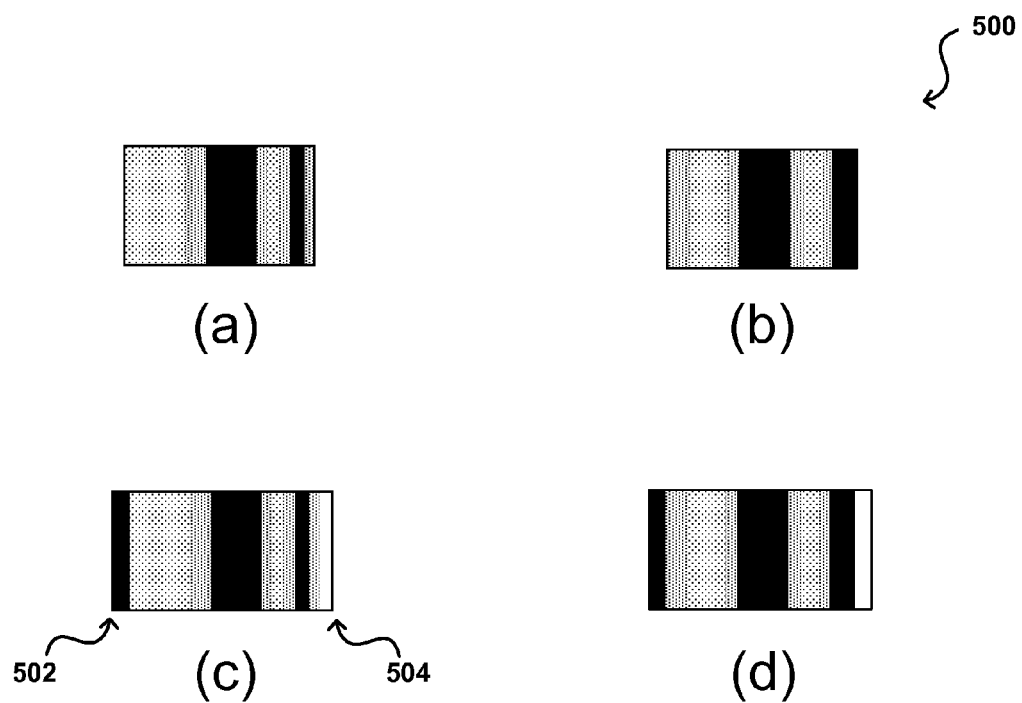
FIGS. 5(a), (b), (c), and (d) illustrate examples of a barcode digit and template being prepared for matching in accordance with one embodiment.

The portion of the image corresponding to each digit then can be compared to the digit templates discussed above. Depending on the format, there can be a fixed number of possible digits at each location based at least in part on the specification of the format. Instead of doing a direct comparison, however, approaches in accordance with various embodiments utilize a black reference bar and a white reference bar added to the image portion for each digit. For example, FIG. 5(a) illustrates a template for a digit 500, and FIG. 5(b) illustrates a digit as captured, after grayscale conversion and scaling. Directly comparing the template of FIG. 5(a) with the image of FIG. 5(b) might be somewhat inaccurate because it can be difficult to correlate the levels of gray in each image without reference to the maximum and minimum values, corresponding to black and white values. Accordingly, FIG. 5(c) illustrates an example of the template with a black reference bar 502 and a white reference bar 504 added to the template for matching purposes. It should be understood that in some embodiments these bars could be part of the template itself. FIG. 5(d) illustrates an example of the image portion corresponding to the digit as captured, with similar reference bars added. The added reference bars improve the performance of the decoder at least in part by preventing an observed digit pattern from matching a digit template when a global scaling between the two could result in a close match. The metric used for comparison can be, for example, the normalized cross-correlation value of the two regions. For each digit position, one or more possible matches are noted that, for example, exceed a certain match percentage or are the best matches regardless of the quality of the match. The set or list of best matching digits at every position then can be used to attempt to determine the actual code.

As part of the matching process, one or more techniques can be utilized to attempt to account for localization error. For example, there can be some amount of error when detecting the left and right edges of a barcode, which can affect the segmentation of the various digits. The error can result, for example, from the fact that the blurring resulted in some uncertainty in the exact edge position that cannot be completely removed in most cases. If the detected left edge of the barcode was at a distance of $l$ pixels from the left edge of the image along the horizontal direction and the right edge was similarly at r pixels, a number of potential barcode locations could be evaluated, such as may include:

$$(l,r); (l-n,r); (l,r-n); (l+n,r); \text{ and } (l,r+n);$$
$$\text{where } n=1,2,3 \ldots$$

In at least some embodiments, the algorithm is also resilient to inaccurate localization at the positions of the various digits. Such inaccuracies could be caused by, for example, local imperfections in the printed barcode (i.e., the code was printed on a non-flat or non-rigid surface). If a given digit is calculated to start at pixel ld and end at digit rd, an algorithm can try different digit locations as well, such as may correspond to:

$$(ld,rd); (ld-n,rd-n); \text{ and } (ld+n,rd+n);$$
$$\text{where } n=1,2,3 \ldots$$

As can be seen by these algorithms, results can be improved by iteratively adjusting the edges inward or outward, one pixel at a time, to attempt to compensate for blur related errors that might be more prominent at one end of the barcode than the other. A similar approach can be used for each individual digit with respect to the barcode as a whole. It at least some embodiments, the shifting of the individual digits can be right or left at both edges together, instead of just one edge, as the size of the digit in most cases leads to sufficiently accurate results due to shifting the entire digit right or left, without the additional processing overhead due to shifting only one side or the other (and interpolating therebetween), which can slow down the process without significantly improving the results.

Once at least one potential match is found for each digit, the best potential candidates for each digit can be assembled for analysis. Table 1 below gives an example of four candidate digits, along with the match score and an amount of shift used for the left and right edges. It should be understood that other information can be used as well, and that in embodiments where digits have the same left and right shift values there can be a single delta value listed.

TABLE 1

Candidate digits resulting from the matching process

| Pos #1 | | | | Pos #2 | | | | Pos #3 | | | | Pos #4 | | | |
|---|---|---|---|---|---|---|---|---|---|---|---|---|---|---|---|
| Digit | Score | Left Delta | Right Delta | Digit | Score | Left Delta | Right Delta | Digit | Score | Left Delta | Right Delta | Digit | Score | Left Delta | Right Delta |
| 7 | 0.95 | 0 | 0 | 8 | 0.96 | 0 | 0 | 0 | 0.97 | 0 | 0 | 1 | 0.98 | −1 | −1 |
| | | | | 2 | 0.89 | 1 | 1 | | | | | 7 | 0.90 | 0 | 0 |

In the above example, there are two potential matches at positions #2 and #4, with one potential match at each of positions #1 and #3, leading to four potential barcode combinations: 7801, 7807, 7201, 7207. In at least some embodiments, one or more algorithms and/or processes can be used to evaluate each of these potential combinations. In one embodiment, each of the candidate barcodes is given a score and then the candidates are sorted according to that score. The scoring can be performed using a combination of the per-digit score and the left/right deltas obtained at each digit. An example scoring function for a barcode is given by the following:

$$\text{Sum of digit scores} - (\text{Standard deviation of left deltas} + \text{Standard deviation of right deltas})$$

Such a scoring function is easy and fast to compute, and usually causes the correct result to sort to the top of the result set. The scoring function can take into account the quality of match at each digit and reward the consistency in localization of the individual digit positions. In order to minimize unnecessary processing, the candidate combinations then can be analyzed in order starting at the most likely candidate.

In one embodiment, the current candidate is examined first to confirm whether the value of the candidate satisfies the checksum properties of the particular barcode format. The inclusion of checksums in barcodes is well known in the art and, as such, will not be discussed herein in detail. In some embodiments, the candidate might be examined for multiple barcode formats. If the candidate value satisfies the checksum properties of the format, the candidate can be returned as the correct result. If the candidate value does not satisfy the checksum properties, the next highest ranked candidate can be evaluated, and so on, until either a correct result is located or none of the candidates are determined to be a correct match. A number of different approaches can be taken if no matches are found, such as to return an error message, notify a user that no matches could be found, or prompt the user to capture another image of the barcode for analysis.

Figure 6:
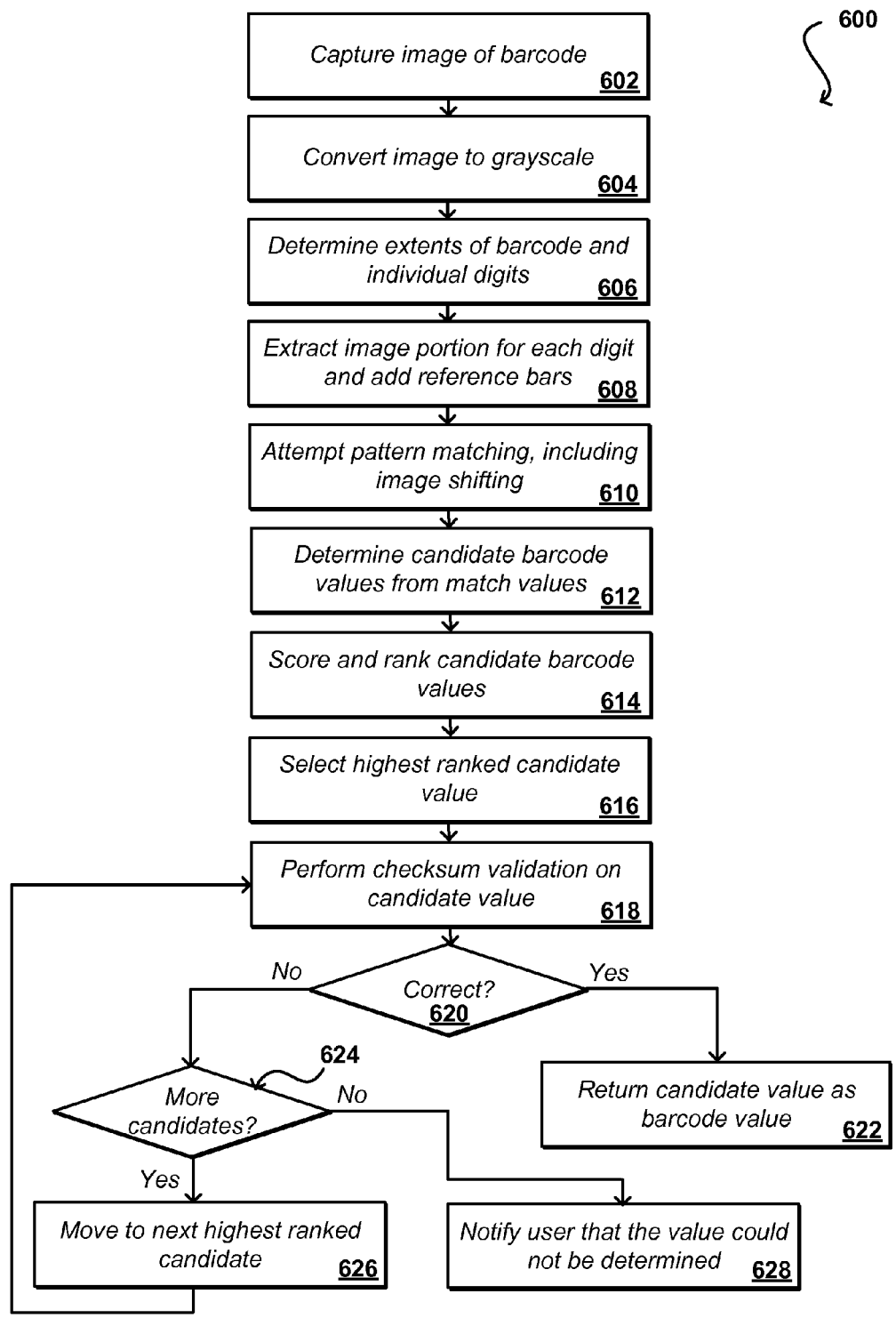
FIG. 6 illustrates an example process for decoding a barcode from an image in accordance with various embodiments.

FIG. 6 illustrates an example overview of a process 600 for decoding a barcode in an image that can be used in accordance with various embodiments. It should be understood, however, that there can be additional, fewer, or alternative steps performed in similar or alternative orders, or in parallel, within the scope of the various embodiments unless otherwise stated. In this example process, an image of a barcode is captured 602. As discussed, this can include capturing an image with a digital still or video camera of a portable device, but can also include other processes such as scanning or imaging with an external device and providing the captured information to a computing device operable to analyze the captured information. If the captured information corresponds to a color image, or otherwise is not in a desired grayscale format, the image can be converted to a grayscale image in at least some embodiments in order to improve accuracy 604. As discussed, this can include increasing the contrast in the image by looking at the values of the various color channels in the image and emphasizing or de-emphasizing certain pixels based at least in part upon those values.

The image then can be analyzed to attempt to find the extents of the barcode in the image, as well as the extents of each digit in the image 606. As discussed, this can entail selecting at least one scan line across the image and attempting to locate areas of white space adjacent a black-to-white or white-to-black transition for the barcode extents. If the extents cannot be determined from the scan line, a different scan line can be selected for analysis. Once the extents of the barcode are determined, the relative extents of the individual digits can be determined based at least in part upon the known relative position of digits in a barcode relative to the extents of the barcode in one or more barcode formats.

The portions of the image can then be extracted from the captured image and, in at least some embodiments, reference bars added to assist with matching 608. A set of digit templates then can be compared against the digit image portion, including left and right shifting of the image to account for positional variations 610. There are a number of pattern matching algorithms that can be used to compare and generate matching or confidence scores as discussed elsewhere herein, and as such these algorithms will not be discussed herein in detail. For each digit at least one value with a highest confidence value will be selected. In situations where there are two or more selections with relatively similar confidence scores, or where there is no confidence score over a given threshold (e.g., 80%), for example, there can be multiple values selected.

Once at least one potential value match has been determined for each digit, the various combinations of digits can be determined to provide a set of potential barcode values 612. In at least some embodiments, these candidate values can be scored using approaches discussed herein, and then ranked according to score 614. A highest (or other appropriate) ranked candidate value then can be selected 616 and checksum validation performed on that value for one or more barcode formats 618. If the checksum is appropriate for the candidate value 620, the candidate value can be returned as a correct barcode value 622. If the checksum validation process indicates that the candidate value is likely not the correct value for the barcode, the process can determine whether there are any more candidate values 624, and if so can move to the next candidate value in the sorted ranking order 626 and perform another checksum validation. The process can continue iteratively (or in parallel or otherwise) until a valid code is determined or there are no more candidate values, at which point the user can be notified that the barcode in the image could not be decoded properly 628, at which point the user can attempt to capture another image for processing, manually enter the code, or perform another such action.

In some cases, the above process might not provide acceptable accurate results due at least in part to some aspect of the barcode and/or captured image. In at least some embodiments, the matching process can continue with additional steps to attempt to find a match while accounting for a number of potential aspects or issues with the captured information. For example, the process might perform additional steps to attempt to handle other barcode formats, such as UPC-E or EAN-8. The process also might attempt to correct for any noise in a central set of rows or other portion of the image, such as where there were specular reflections in the captured image or the barcode was damaged in some way. The process might also attempt to address the fact that the barcode might be placed on a curved or other non-flat surface, such as where the barcode is on a bottle or can.

For other barcode formats, many of the steps or approaches described above can be applied as well. In some embodiments, the process can first be run for a most common barcode format, and then can be re-run for each of a number of other less common formats until a match is found or it is determined that the image cannot be decoded. In other embodiments, certain steps of the process can be performed multiple times for different formats, such that the entire process does not have to be repeated in sequence for each potential format until a match is found. Similarly, when favorable results cannot be obtained using a given scanline, additional scanlines can be analyzed for the same image. These additional scan line attempts can be done serially as well, or multiple scan lines can be analyzed at the same time in order to decrease the average result time, although such an approach would also increase the average amount of resources needed to find a result. Similar additional processing can be required to address the potential for a curved barcode. Fortunately, the processes described herein can be performed quickly, such that multiple variations of the barcode decoder can be executed concurrently in order to attempt to capture any anticipated variation. Various combinations of the processes can be utilized for each incoming image to attempt to obtain the most accurate barcode results. In some embodiments, an additional step can be used to attempt to improve the result, such as to perform an analysis step to determine whether the barcode is likely flat or curved, where an optimal scan line might be selected, which formats are likely matches based on a shape of the barcode, etc. Retries also can be arranged or selected in a logical way, such as to try the most common variations first, in order to decrease the average time needed to decode a barcode. An example set of variations are illustrated in Table 2.

TABLE 2 potential barcode variations

| Variation # | Type | Scanline (relative to center) | Curvature (degrees) |
|---|---|---|---|
| 1 | UPC-A/EAN-13 | 0 | 0 |
| 2 | UPC-E | 0 | 0 |
| 3 | EAN-8 | 0 | 0 |
| 4 | UPC-A/EAN-13 | 15 | 0 |
| 5 | UPC-E | 15 | 0 |
| 6 | EAN-8 | 15 | 0 |
| 7 | UPC-A/EAN-13 | -15 | 0 |
| 8 | UPC-E | -15 | 0 |
| 9 | EAN-8 | -15 | 0 |
| 10 | UPC-A/EAN-13 | 0 | 60 |
| 11 | UPC-A/EAN-13 | 0 | 75 |
| 12 | UPC-A/EAN-13 | 0 | 90 |

As can be seen from Table 2, not all combinations of the different parameters need to be evaluated. For example the curvature retries are not used for EAN-8 and UPC-E barcodes, as these barcodes are not as wide when printed and are usually not as affected by the curvature of the surface that they are printed on. The curvature retries in this example are only performed at the central scanline of the image, as the curvature of the cylindrical object typically causes the best image to usually be on the center. Depending on the device, for example, more or less of these variations may be evaluated on every frame.

Figure 7:
FIG. 7 illustrates an example of a curved barcode that can be processed in accordance with various embodiments.

Barcodes that are printed on horizontally curved surfaces present a different challenge to decoding algorithms. FIG. 7 illustrates an example of a curved barcode 700 on an object as that barcode might be represented in a captured image. The projection of the curved barcode onto the camera can cause different sections of the imaged barcode to have different widths. For example, a central portion of the curved barcode (or a portion that is closest to the camera) will generally generate wider bars and spaces than at the edges of the barcode (or portions further away from the camera). This warping of the bars and spacings in at least some embodiments will need to be corrected, or at least accounted for, before the barcode can be properly decoded using at least some algorithms discussed herein.

Figure 8:
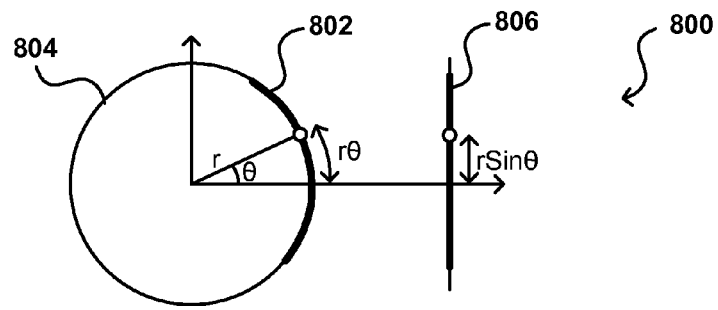
FIG. 8 illustrates an example approach for shifting the position of bits in an image captured of a curved barcode that can be used in accordance with various embodiments.

One approach that can be used to account for the variations due to curvature will be discussed with respect to FIG. 8. The barcode 802 in this example is printed on a curved item 804, and corresponds to a portion of an arc in shape. The projection 806 of the barcode onto a flat surface represents how the barcode would be displayed on an image captured by a camera, corresponding to the camera imager plane. When considering the barcode as part of an arc, the distance of a point along the barcode from the center of the barcode is given by $r\theta$. On the imaging plane, the distance is observed as $r \sin \theta$. Knowing this relationship, the camera image can be adjusted using the following example shifting formulas:

Observed distance from the center: $Dist\_obs = r \sin \theta$

Actual distance from the center: $Dist\_act = r\theta$

Actual distance: $Dist\_act = Dist\_obs * \theta / \sin \theta$

It can be seen that the correction does not need an estimate of the value of r, the radius of curvature of the object. Instead, all that is needed is an estimate of the curvature of the barcode in terms of the angle subtended on the center of the curved object. This curvature can be difficult to estimate in at least some situations. Accordingly, approaches in accordance with various embodiments instead try a set of discrete curvature values that span a range of anticipated curvatures. In one embodiment, an algorithm attempts curvatures of 0° (flat), 60°, 75°, and 90° of curvature. Curvatures between 0° and 60° are generally not needed to produce accurate results, although depending on a number of different factors or specific requirements any of a number of other combinations of discrete curvature values could be used as well. In some embodiments, additional curvatures can be used, and any curvature leading to a successful result can be added to the set of curvatures to be utilized by default.

Figure 9:
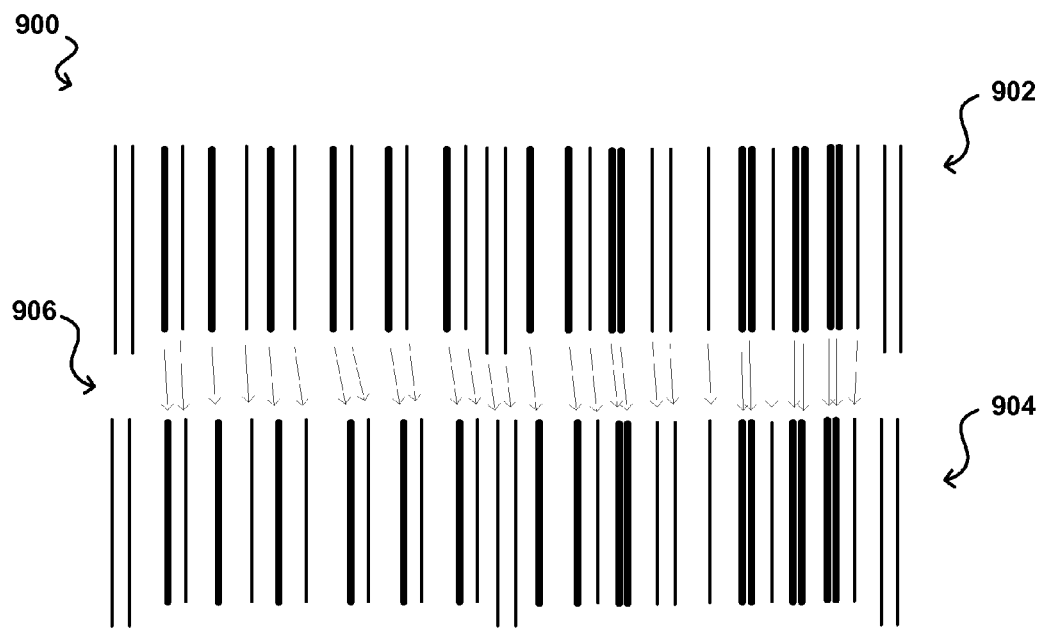
FIG. 9 illustrates an example shifting of bits for a curved barcode in accordance with one embodiment.

For each curvature to be tested, the position of each bit in the image (e.g., the actual distance from center in the above formulas) can be shifted according to the appropriate shifting values for that curvature. FIG. 9 illustrates an example situation 900 wherein the positions of various bytes in a capture barcode image 902 are shifted according to the selected shifting formulas. In this example, the position of the middle pattern is first detected, which in some embodiments determines the percentage of curvature that is assigned to the left half of the barcode versus the right half. In such embodiments, a shifting process can be applied separately to each half of the barcode. In such a process, the relative position of each bit in the barcode image 902 is examined, and the position of that bit can be shifted in an appropriate direction 906 by an appropriate amount as determined by the shifting formulas. After the bits are shifted, the resulting barcode image 904 should substantially match the imaged barcode if the barcode had been placed on a flat surface. After the shifted image is obtained, any of the above-referenced processes can be used to attempt to decode the information in the barcode image. As discussed, the shifting might need to be performed at various curvature values if no correct value can be determined.

As mentioned, advantages of such fast and lightweight approaches include the ability to run the decoding on a client device, such as a cell phone or tablet computer, without any interaction with a server in at least some embodiments. As discussed, however, various portions can be run on a separate system or service if necessary and/or desired, such as where a user uploads a captured image and receives back information pertaining to the barcode, such as the actual code or information about an item associated with that code.

Figure 10:
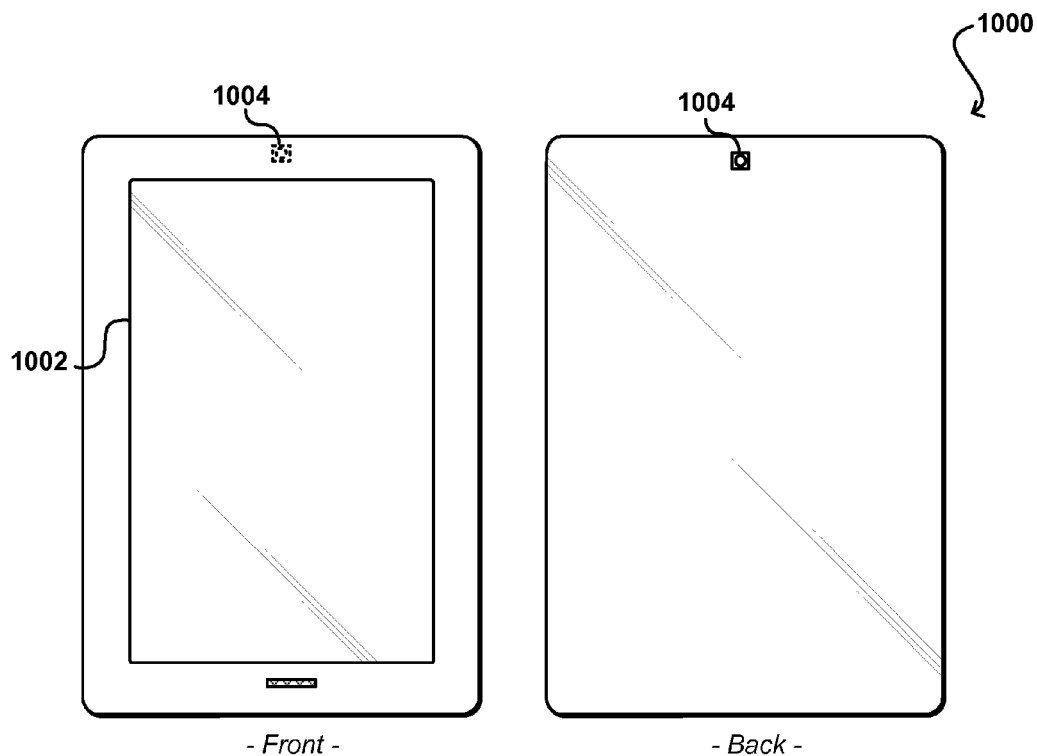
FIG. 10 illustrates front and back views of an example device that can be used in accordance with various embodiments.

FIG. 10 illustrates an example of a computing device 1000 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1000 has a display screen 1002, which under normal operation will display information to a user facing the display screen (e.g., on the same side of the computing device as the display screen). The computing device in this example can include one or more image capture elements, in this example including one image capture element 1004 on the back side of the device, although it should be understood that image capture elements could also, or alternatively, be placed on the sides or corners of the device, and that there can be any appropriate number of capture elements of similar or different types. Each image capture element 1004 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 11:
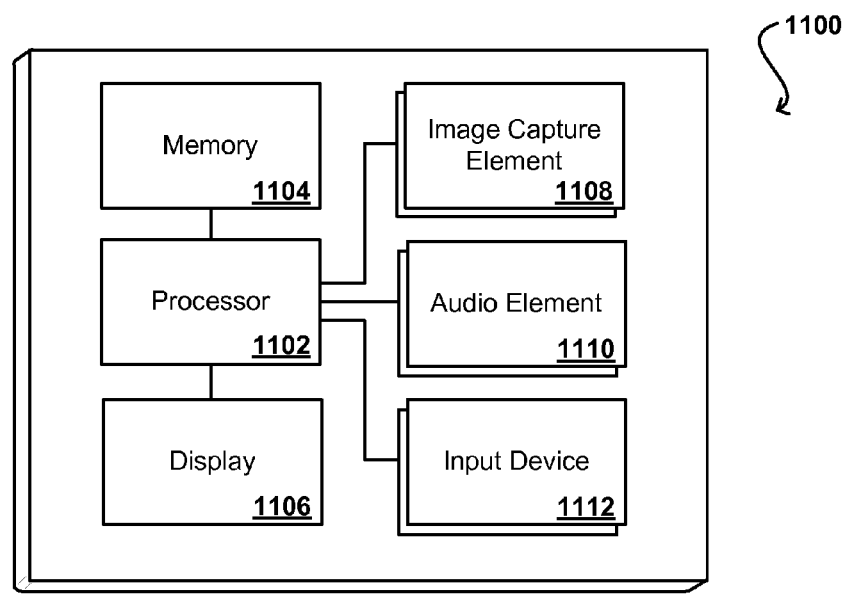
FIG. 11 illustrates an example configuration of components of a device such as that described with respect to FIG. 10.

FIG. 11 illustrates a set of basic components of a computing device 1100 such as the device 1100 described with respect to FIG. 10. In this example, the device includes at least one processor 1102 for executing instructions that can be stored in a memory device or element 1104. As would be apparent to one of ordinary skill in the art, the device can include many types of memory, data storage or computer-readable media, such as a first data storage for program instructions for execution by the processor 1102, the same or separate storage can be used for images or data, a removable memory can be available for sharing information with other devices, and any number of communication approaches can be available for sharing with other devices. The device typically will include some type of display element 1106, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1108, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one additional input device 1112 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 12:
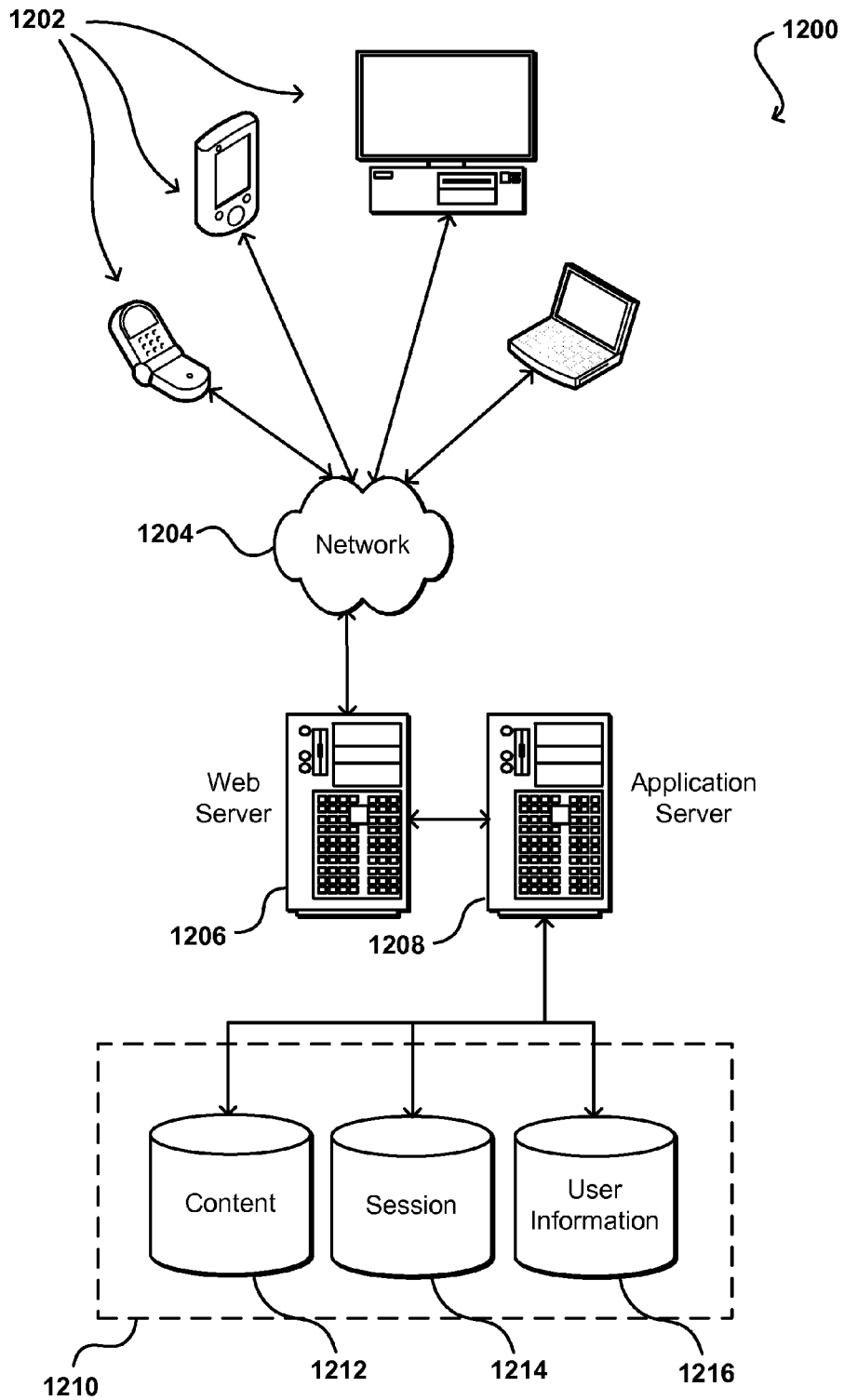
FIG. 12 illustrates an example environment in which various aspects of the various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for decoding a barcode using a computing device, comprising:
    capturing an image of the barcode using an image capture element of the computing device;
    converting the image to a grayscale image in part by examining maximum and minimum values for each color channel at each pixel to be converted;
    determining positional extents of the barcode in the grayscale image and each digit in the barcode for a selected barcode format;
    performing a pattern matching process for each digit of the barcode using a portion of the grayscale image defined by the positional extents, the pattern matching process utilizing at least one digit template for each possible value of the digit at a given position in the barcode;
    determining a set of combinations of potential matches for digits of the barcode, each combination including a potential match for each digit of the barcode;
    performing checksum validation against at least one of the set of combinations; and
    selecting the combination having a valid checksum as a value of the barcode.

2. The computer-implemented method of claim 1, wherein the pattern matching process includes determining a normalized cross-correlation value of the portion of the grayscale image corresponding to a respective digit of the barcode and the at least one digit template for the possible value of the respective digit.

3. The computer-implemented method of claim 1, further comprising:
    scaling the portion of the image between the positional extents of the barcode to an integral number of bits of the selected barcode format.

4. The computer-implemented method of claim 1, wherein performing the pattern matching process includes adding reference bars to each end of the portion of the grayscale image for each digit and each end of the at least one digit template for the given position of that digit in the barcode.

5. The computer-implemented method of claim 1, wherein the at least one digit template is generated by at least:
    obtaining a second image corresponding to a bit pattern for the possible value at the given position in the barcode;
    adding one bit to each end of the bit pattern in the second image, each added bit representing a bit value opposite to an adjacent bit value in the bit pattern;
    generating one or more additional images each corresponding to a different blur level of the second image with added bits; and
    removing portions of the second image corresponding to the added bits to create the at least one digit template.

6. A computer-implemented method for decoding a barcode, comprising:
    under control of one or more computer systems configured with executable instructions,
        obtaining an image including at least a portion of a barcode;
        determining a portion of the image corresponding to a region of each digit of a selected barcode format;
        comparing the portion of the image for each digit to a set of templates each representing a possible value for the digit at a specific position in the barcode;
        generating a set of potential barcode combinations including a potential value for each digit as determined by one or more matching templates for each digit; and
        returning a potential barcode combination with a valid checksum as a determined value of the barcode.

7. The computer-implemented method of claim 6, wherein the portion of the image corresponding to the region of each digit is determined in part by selecting a scan line through the portion of the image corresponding to the barcode and examining transitions and whitespace along the scan line to determine a left extent and a right extent of the barcode.

8. The computer-implemented method of claim 7, wherein determining the portion of the image corresponding to the region of each digit further comprises segmenting the portion of the image between the left extent and the right extent based at least in part upon a determined number of digits of the selected barcode format.

9. The computer-implemented method of claim 6, wherein comparing the portion of the image for each digit to the set of templates includes adding reference bars to each end of the portion of the image and the set of templates.

10. The computer-implemented method of claim 6, wherein the one or more matching templates for each digit are selected based at least in part upon a minimum match confidence score.

11. The computer-implemented method of claim 6, further comprising:
    shifting the portion of the image for at least one selected digit by at least one pixel in at least one direction and comparing the portion of the image being shifted to the set of templates during a matching process to account for potential positional differences.

12. The computer-implemented method of claim 6, further comprising:
   determining an item associated with the barcode; and
   providing information about the item.

13. The computer-implemented method of claim 6, wherein the image is obtained by capturing the image using a camera of a computing device.

14. The computer-implemented method of claim 13, wherein the image is processed on the computing device or transmitted to a remote device for processing.

15. The computer-implemented method of claim 6, further comprising:
   providing a notification if no potential barcode combination has the valid checksum.

16. The computer-implemented method of claim 6, further comprising:
   repeating the determining, comparing, and generating steps for a different barcode format if no potential barcode combination has the valid checksum.

17. The computer-implemented method of claim 7, further comprising:
   selecting a different scan line used to determine the portion of image corresponding to the region of each digit and repeating the comparing and generating steps for the different scan line if no potential barcode combination has the valid checksum.

18. The computer-implemented method of claim 6, further comprising:
   shifting positions of one or more bits in the image to attempt to remove skewing of the image due to curvature of the barcode if no potential barcode combination has the valid checksum.

19. The computer-implemented method of claim 18, wherein to attempt to remove the skewing due to the curvature of the barcode includes shifting a position of at least one bit to represent an actual distance, from a first center of the barcode, instead of an observed position, from the first center of the barcode in the image, as given by:

actual distance=observed distance*θ/Sin θ, where θ represents an angle subtended on a second center of a curved object to which the barcode is attached.

20. The computer-implemented method of claim 6, further comprising:
   converting the image to grayscale before determining the portion of the image corresponding to the region of each digit.

21. The computer-implemented method of claim 20, wherein converting the image to grayscale includes normalizing color values for each color channel of each pixel, to be analyzed, to a value between 0 and 1, and
   wherein a color value of each pixel is adjusted to a maximum channel value if all channel values for the pixel are above 0.5, a minimum channel value if all of the channel values for the pixel are at or below 0.5, and an average channel value in all other cases.

22. A computer-implemented method of creating matching templates for barcode digits, comprising:
   under control of one or more computing systems configured with executable instructions,
      determining a number of digits in a selected barcode format and a set of potential values for each digit;
      for each potential value of each digit:
         determining an image corresponding to a bit pattern for the potential value;
         adding one bit to each end of the bit pattern in the image, each added bit having a value representing a bit value opposite an adjacent bit value in the bit pattern;
         generating one or more additional images each corresponding to a different blur level of the image with added bits; and
         removing portions of the image corresponding to the added bits to create a matching template; and
      storing the matching template for each digit as a set of matching templates for the digit at a given position for the selected barcode format.

23. The computer-implemented method of claim 22, wherein storing the matching template is performed as part of an offline process before performing pattern matching.

24. The computer-implemented method of claim 22, wherein the set of matching templates corresponds to grayscale images.

25. The computer-implemented method of claim 22, wherein the set of matching templates for each digit are stored on a computing device operable to capture images and perform matching or at a remote location accessible to the computing device.

26. A computing device, comprising:
   a processor;
   an image capture element;
   a display element; and
   memory storing instructions that, when executed by the processor, cause the computing device to:
      capture an image including at least a portion of a barcode using the image capture element;
      determine a portion of the image corresponding to a region of each digit of a selected barcode format;
      compare the portion of the image for each digit to a set of templates each representing a possible value for the digit at a specific position in the barcode;
      generate a set of potential barcode combinations including a potential value for each digit as determined by one or more matching templates for each digit;
      select a potential barcode combination with a valid checksum as a determined value of the barcode; and
      display on the display element information associated with the determined value of the barcode.

27. The computing device of claim 26, wherein the instructions when executed further cause the computing device, when no potential barcode combination has the valid checksum, to perform at least one of:
   providing a notification on the display element;
   repeating the determine, compare, and generate steps for a different barcode format;
   selecting a different scan line used to determine the portion of image corresponding to the region of each digit and repeating the compare and generate steps for the different barcode format; or
   shifting positions of one or more bits in the image to attempt to remove skewing of the image due to curvature of the barcode.

28. A non-transitory computer readable storage medium storing instructions for decoding an image of a barcode, the instructions when executed by a processor causing the processor to:
   obtain an image including at least a portion of a barcode;
   determine a portion of the image corresponding to a region of each digit of a selected barcode format;
   compare the portion of the image for each digit to a set of templates each representing a possible value for the digit at a specific position in the barcode;

generate a set of potential barcode combinations including a potential value for each digit as determined by one or more matching templates for each digit;

select a potential barcode combination with a valid checksum as a determined value of the barcode; and provide information associated with the determined value of the barcode.

29. The non-transitory computer readable storage medium of claim 28, wherein the instructions when executed by the processor causing the processor to determine the portion of the image corresponding to the region of each digit further cause the processor to:

select a scan line through the portion of the image corresponding to the barcode;

examine transitions and whitespace along the scan line to determine a left extent and a right extent of the barcode; and segment the portion of the image between the left extent and the right extent based at least in part upon a determined number of digits of the selected barcode format.

* * * * *